(Model.)

J. M. HEULINGS.
FERTILIZER DISTRIBUTER.

No. 256,799. Patented Apr. 18, 1882.

Witnesses:
Rob. E. Hackett
Benjamin T. Brooke

Inventor
Joseph M. Heulings
by Francis D. Pastorius
Attorney

UNITED STATES PATENT OFFICE.

JOSEPH M. HEULINGS, OF ELLISBURG, NEW JERSEY.

FERTILIZER-DISTRIBUTER.

SPECIFICATION forming part of Letters Patent No. 256,799, dated April 18, 1882.

Application filed May 19, 1881. (Model.)

*To all whom it may concern:*

Be it known that I, JOSEPH M. HEULINGS, of Ellisburg, in the county of Camden and State of New Jersey, have invented a new and useful Fertilizer-Distributer, of which the following is a specification.

The invention consists of a drum which is divided by a partition, thus making two apartments, one being the material-box and the other the delivery-box. The drum or case is made to revolve by means of a pulley of its shaft being belted to a pulley of the bearing-wheel shaft of the plow or other implement to which the invention may be applied. On the plow being started the drum is caused to revolve, and the material passes beyond the edge of the transverse partition into the delivery-box, which is provided with a series of holes for dropping it to the ground in patches and at suitable intervals apart, all as hereinafter specified and claimed.

Figure 1:
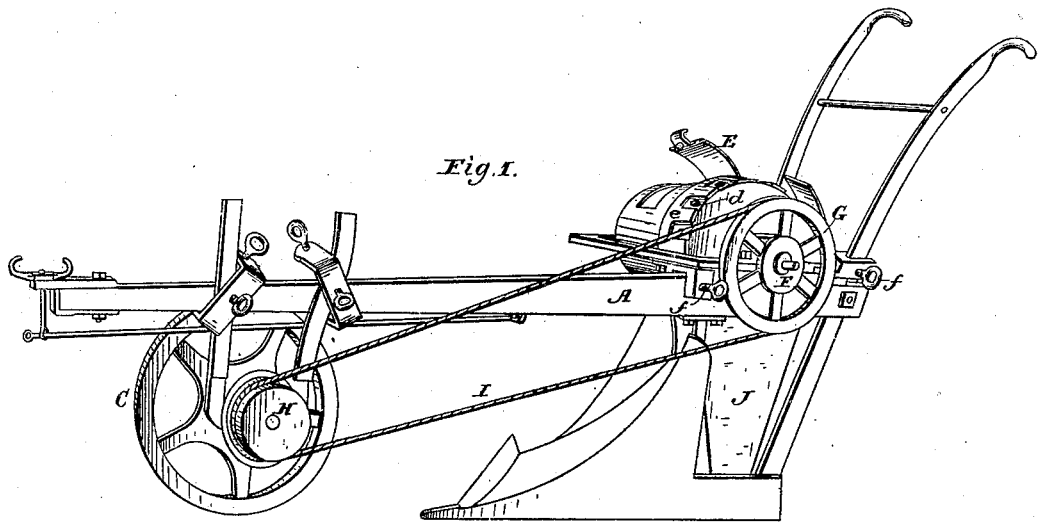
Figure 2:
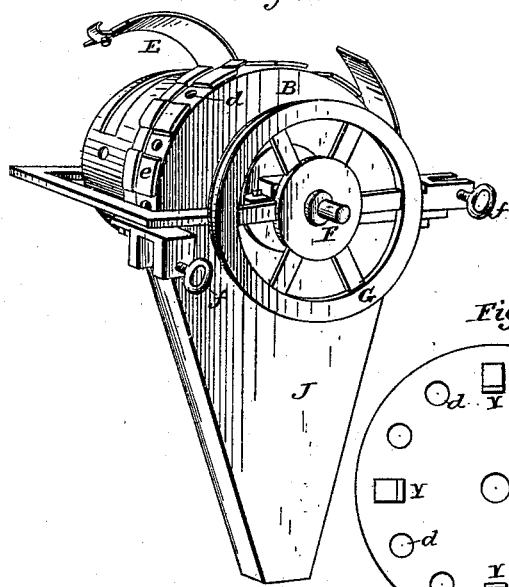
Figure 3:
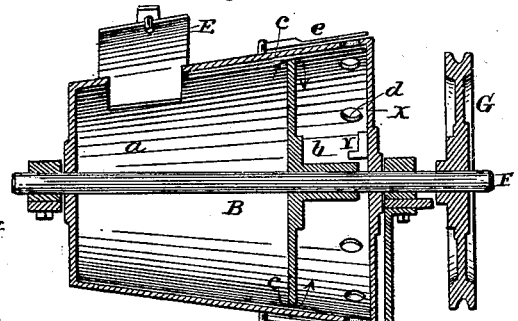
Figure 4:
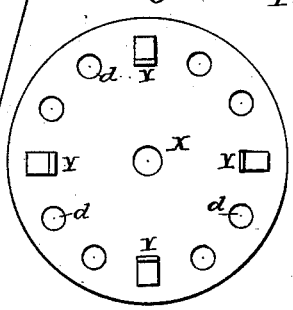
Figure 5:
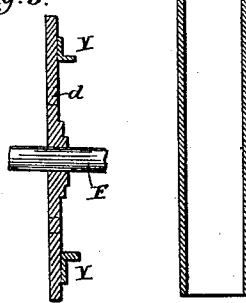
Figure 6:

Reference being had to the mechanism illustrated in the accompanying drawings, Figure 1 is a perspective side elevation, showing the invention applied to a plow and the arrangements for working the various parts. Fig. 2 is an enlarged perspective elevation of the drum or case. Fig. 3 is a longitudinal sectional elevation of the drum. Fig. 4 is a surface view of the head of the drum at drop-chamber end. Fig. 5 is an edge view of Fig. 4, and Fig. 6 is a perspective view of the lifters.

A is the frame of a plow, to which is fixed the fertilizer drum or case B, conoidal in shape.

C is a wheel for carrying the front of the plow. It is additionally employed for communicating motion to the moving parts, as hereinafter described.

Fig. 3 is a section of the drum, showing the transverse partition D, by which it is divided into the material and delivery chambers *a b*. This partition is smaller than the internal diameter of the drum to leave an annular space, *c*, for communicating the divisions.

E is a lid or cover of the chamber *a*, and *d* are openings in the surface of the chamber *b*, which are opened and closed by means of a ring or slide, *e*.

F is the shaft of the drum in bearings of the plow-frame. It has a pulley, G, fixed to it, which connects with the pulley H on the shaft of the bearing-wheel C by means of a belt, I.

On the chamber *a* of the drum B being filled with fertilizing material and the plow started, the wheel C puts the pulley H in motion, which is communicated by the belt I to the pulley G and shaft F, and thereby causes the drum to revolve and the material in the chamber *a* to pass through the annular space *c* into the chamber *b*, from which it is delivered through the openings *d* to the spout J at intervals and dropped onto the ground.

The space *c* between the surface of the drum and the edge of the partition regulates the amount of the material for the delivery-chamber *a*, and also prevents the passage of large particles and lumps, which would stop up the holes *d*, and thus hinder the working of the machine. In the invention as illustrated the fertilizing material is dropped through the spout J into the furrow made by the plow. This may be changed by loosening the thumb-screws *f* and reversing the position of the drum by changing it end for end, which will place the holes *d* at the other side and drop the fertilizing material beyond the plow.

To prevent the fertilizing material from hardening and sliding on the bottom of chamber *b*, the head X is provided with lifters Y, which raise the material from the bottom of the chamber *b* during its turning, and thus prevent it from stopping up the holes *d*.

The invention is shown applied to a plow. I do not confine its application to any specified agricultural implement. It can be detached and stowed away when not in use, and its attendant tool used for other purposes. By making the drum conoidal, as illustrated, the material is more satisfactorily and easily fed from one end of the drum to the other.

What I claim as my invention, and desire to secure by Letters Patent, is—

1. The conoidal-shaped drum B, supported in a frame adapted to be clamped to an agricultural implement, and divided transversely by partition D into apartments $a$ and $b$, the apartment $b$ having openings $d$, in combination with valves $e$ and spout J, whereby the drum can be adjusted and the material fed, as and for the purpose set forth.

2. The revolving drum B, divided by the partition D into apartments $a$ and $b$, having openings $d$ and lifters Y, in combination with valves $e$ and spout J, substantially as and for the purpose set forth.

JOSEPH M. HEULINGS.

Witnesses:
J. G. BOUKER,
ALDEN B. CLEMENT.